April 7, 1970  J. W. EVELEIGH  3,505,021
METHOD OF AMINO ACID CHROMATOGRAPHY ANALYSIS
Filed Nov. 13, 1967
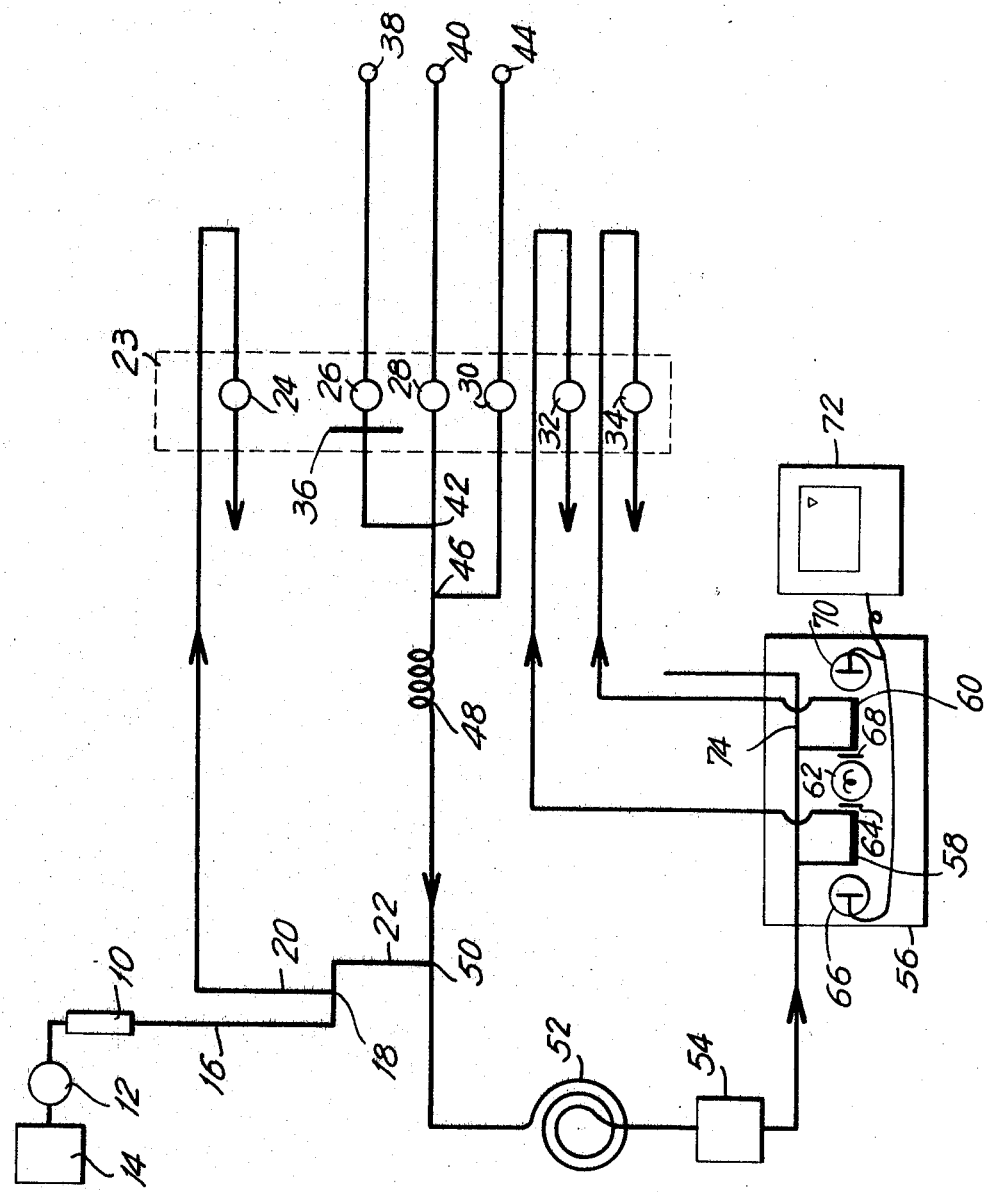
INVENTOR.
JOHN W. EVELEIGH
BY 
ATTORNEY United States Patent Office 3,505,021
Patented Apr. 7, 1970

3,505,021
METHOD OF AMINO ACID CHROMATOGRAPHY ANALYSIS
John W. Eveleigh, Purdy Station, N.Y., assignor to Technicon Corporation, Ardsley, N.Y., a corporation of New York
Filed Nov. 13, 1967, Ser. No. 682,425
Int. Cl. G01n 31/06
U.S. Cl. 23—230                                    5 Claims

ABSTRACT OF THE DISCLOSURE

A method of increasing the sensitivity with linear optical density of a ninhydrin color reaction with amino acids in a chromatography eluent stream includes the addition of hydrazine as a stable stock solution to the ninhydrin at the time of use.

BACKGROUND OF THE INVENTION

Field of the invention

This invention relates to automatic chromatographic column amino acid analysis, and particularly to reagents for providing a color whose optical density is responsive to the concentration of amino acids in the eluent stream from the chromatographic column.

Prior art

In automatic chromatographic column amino acid analysis, a liquid sample is initially layered into the top portion of a column continuing a suitable ion exchange resin. Subsequently, an eluting liquid is passed through the column to sequentially strip the constituents of the sample from the resin. A reagent is added to and mixed with the eluent stream from the column to produce a color in this stream whose optical density at any increment thereof to a particular wave length of light is responsive to the concentration of amino acid in such increment. Ninhydrin is customarily used as the color producing reagent. The specific chemistry of the ninhydrin-amino acid reaction is not well known, but it is thought that the ninhydrin combines with the free amino acid groups. Such an analytical system was shown in "Automatic Recording Apparatus for Use in the Chromatography of Amino Acids," Analytical Chemistry, by Spackman, Stein and Moore, vol. 30, No. 7, July 1958, pp. 1190–1206. Subsequently various combinations including ninhydrin have been proposed to make the color reaction more sensitive which include either hydrindantin, sodium cyanide, acetate cyanide, stannous chloride or ferricyanide. See, for example, Biochem, J. (1966), 5c; Analytical Biochemistry 9, 170–174 (1964); Analytical Biochemistry 12, 189–198 (1965). In these combinations, the additive, which is added at the time of use, may be reducing the ninhydrin to hydrinantin which combines with amino acids. In this regard it should be noted that ferricyanide is considered to be an oxidizing agent. Each of these additives suffers from some flaw. For example, sodium cyanide is critical in concentration. Ferricyanide changes color with respect to pH, and the eluent stream is customarily made to vary in pH. Further, each of these reducing compounds is relatively unstable in storage.

Accordingly, it is an object of the invention to provide an "activating" additive for ninhydrin which improves the sensitivity of the reaction, is not color senstive to pH, and is stable in storage for weeks.

SUMMARY OF THE INVENTION

A feature of the invention lies in the use of hydrazine as an activating additive for ninhydrin in an amino acid color producing analytical system.

BRIEF DESCRIPTION OF THE DRAWING

These and other objects, features and advantages of the invention will be apparent from the following specification thereof taken in conjunction with the drawing in which:

The figure comprises a flow diagram of an amino acid color producing analytical system embodying this invention.

DESCRIPTION OF THE INVENTION

The figure comprises a flow diagram of an apparatus which is of a type similar to that shown in U.S. Patent No. 3,010,798 issued to E. C. Whitehead et al. on Nov. 28, 1961 and U.S. Patent No. 3,074,784 issued to A. Ferrari, Jr. on Jan. 22, 1963.

The column 10 containing an ion exchange resin into which the sample has been layered, is eluted by a positive displacement pump 12, such as is shown in U.S. Patent No. 3,288,079 issued to N.G. Kling on Nov. 29, 1966, advancing a buffer solution from a supply 14, such as is shown in U.S. 3,137,480 issued to J. Isreeli on June 16, 1964 into the top of the column. The eluent stream flowing in a conduit 16 from the bottom of the column 10 is divided at a fitting 18 into two quotient streams flowing in respective conduits, one 20 of which is drawn off for storage, and the other 22 of which is analyzed. A peristaltic type pump 23, such as is shown in U.S. Patent No. 3,306,229 issued to W. J. Smythe on Feb. 28, 1967, is used to advance the streams. The pump has a plurality of resiliently compressible tubes 24, 26, 28, 30, 32 and 34 which are progressively compressed by rollers to advance fluids therethrough at proportional volumetric flow rates. The flow through the tube 26 is normally blocked and is periodically unblocked by pinch clamp or gas bar 36 as discussed in U.S. 3,306,229 supra.

The conduit 20 is coupled to the inlet of the pump tube 24 which passes the respective quotient stream to a suitable fraction collector, not shown here, such as is shown in U.S. Patent No. 2,710,715 issued to G. Gorham on June 14, 1955.

The inlet of the pump tube 26 is coupled to a source 38 of inert gas, such as nitrogen. The inlet of the pump tube 28 is coupled to a source 40 of ninhydrin. The outlets of the tube are coupled at a fitting 42 so that the stream of ninhydrin is uniformly sequentized by segments of nitrogen. The inlet of the pump tube 30 is coupled to a source 44 of hydrazine and its outlet is coupled to a fitting 46 which is also coupled to the fitting 42, so that the hydrazine is uniformly added to each segment of ninhydrin.

The fitting 46 is coupled to the inlet of a mixing coil 48, such as is shown in U.S. Patent No. 2,933,293, issued to A. Ferrari, Jr. on Apr. 19, 1960. The outlet of the mixing coil is coupled to a fitting 50 which is also coupled to the conduit 22, so that the quotient eluent stream is uniformly added to the sequential ninhydrinhydrazine stream. The fitting 50 is coupled to the inlet of a heating bath 52, such as is shown in U.S. Patent No. 3,057,603 issued to J. Isreeli on Oct. 9, 1962, which may be operated at 95° C. The outlet of the heating bath is coupled to the inlet of a cooling device 54 whose outlet is coupled to a colorimeter 56 having two flow cells 58 and 60. The sight passageway of the cell 58 is illuminated by a light source 62 through a 440 m$\mu$ pass filter 64 to a suitable photodetector 66. The sight passageway of the cell 60 is illuminated by source 62 through a 570 m$\mu$ pass filter 68 to a suitable photodetector 70. The outlet signals from the photodetectors are coupled to a two channel chart recorder 72. Additional photodetectors, not shown, may be provided to generate difference signals for a null balancing recorder, such as is shown in U.S. Patent No.

3,031,917 issued to M. H. Pelavin on May 1, 1962. The flow cells may be of the type shown in U.S. patent application Ser. No. 556,749 of L. T. Skeggs filed June 10, 1966 and assigned to a common assignee. The pump tube 32 is coupled to the outlet of the sight passageway of the cell 58 and draws a liquid stream which is free of gas segments therethrough. The pump tube 34 is coupled to the outlet of the sight passageway of the cell 60 and draws a liquid stream which is free of gas segments therethrough. The outlets of tubes 32 and 34 and the sight passageway supply conduit 74 discharge to waste.

In the embodiment shown, I have obtained maximum sensitivity with linear optical density for an eluent stream of 0.5 milliliter/minute containing amino acids up to a concentration of 0.1 millimolar, reacted with ninhydrin provided as 1 gram percent in 40% dimethylformamide containing 20% 4 N NaAc buffer volume/volume, and the hydrazine provided as 1 millimolar aqueous hydrazine sulphate. This works out to a total reaction mixture volume/volume, of 30% sample, 50% ninhydrin and 20% hydrazine.

I have found that hydrazine activates the ninhydrin into a faster, more sensitive color reaction with amino acids than ninhydrin alone or in combination with hydrindantin. I have found that hydrazine sulphate and hydrazine chloride produce the result and are stable for at least several weeks in the atmosphere. Since it is the hydrazine that is the active agent I believe that the other salts of hydrazine, and any form of hydrazine may be utilized. The solid salts of hydrazine have the advantage that they are stable and they can be weighed out in small quantities to make up stock solutions which can be conveniently proportionally pumped. However, the use of hydrazine gas should be feasible. In this case the gas could be supplied by a pump such as is shown in U.S. Patent No. 3,072,296 issued to J. Isreeli on Jan. 8, 1963.

What is claimed is:

1. In a method of quantitative analysis for amino acids in a liquid wherein ninhydrin is added to the liquid to provide a color to the liquid whose optical density at a particular wave length is responsive to the concentration of amino acids therein, the improvement of adding hydrazine to the ninhydrin.

2. In a method according to claim 1 wherein the hydrazine is added as a solution of a hydrazine salt.

3. In a method according to claim 2 wherein the hydrazine salt is hydrazine sulphate.

4. In a method according to claim 2 wherein the hydrazine salt is hydrazine chloride.

5. In a method according to claim 2 wherein the reaction mixture is substantially of the following proportions;

eluent stream of 0.5 milliliter/minute containing amino acids up to a concentration of 0.1 millimolar;
  ninhydrin provided as 1 gram percent in 40% dimethylformamide containing 20% 4 N NaAc buffer volume/volume; and
  hydrazine provided as 1 millimolar aqueous hydrazine sulphate.

References Cited

Kasai et al.: Chem. Abstr. 63, 18632g (1965).

MORRIS O. WOLK, Primary Examiner

R. M. REESE, Assistant Examiner